_United States Patent Office_  
2,874,176  
Patented Feb. 17, 1959

2,874,176

SEPARATING METALLIC CATIONS WITH PERFLUOROCARBOXYLIC ACIDS

Gordon F. Mills and Howard B. Whetsel, Oak Ridge, Tenn.

No Drawing. Application August 30, 1956
Serial No. 606,987

14 Claims. (Cl. 260—429.1)

This invention relates to the separation of metallic cations from aqueous solutions and particularly the removal or retention of cations in such aqueous solutions of selected cations when the perfluoroalkyl monocarboxylic acid compounds containing such cations are extracted or precipitated selectively.

The principal object of the present invention is to provide a process which is particularly effective in the removal of metallic cations which are commonly retained in the course of chemical and metallurgical operations, in order that compounds and elements of substantially higher purity may result.

Another object of the present invention is to provide a process for the separation of cations in aqueous solutions which may be carried out readily in conventional extraction apparatus.

Still another object of this invention is to provide a purification process wherein the most expensive reagent is not actually consumed, except for nominal handling losses, and may be repeatedly recycled during successive separation of a variety of cations.

An additional object of the instant invention is to provide a process for the separation of cations from aqueous solutions which is readily adaptable for use in the same apparatus in the successive separation of a wide variety of cations with minor variations in concentrations and/or reagents for the most effective conditions for respective separations.

A further object of the subject invention is to provide a process for the selective separation of certain cations by extraction and certain other cations by precipitation, both, however, being primarily concerned with the solubility of cation compounds in an appropriate solvent phase.

Other objects of the invention include providing a process for the effective and relatively simple separation of cations from aqueous solutions which cations presently are very difficult to separate.

We have discovered a process for the effective separation of a metallic cation from an aqueous solution containing a mixture of metallic cations by treating said aqueous solution with a perfluorocarboxylic acid, or an alkali metal salt of such acid, to produce a compound between said selected cation and said perfluorocarboxylic acid which is substantially insoluble in a solvent phase while the compound, or compounds, formed between the other cations in said aqueous solution and said perfluorocarboxylic acid are substantially soluble in said solvent phase.

When the differential solubility characteristics of the cation-perfluorocarboxylic compounds indicate that solvent extraction is the generally preferred procedure, the process for separating a selected cation from an aqueous solution containing a mixture of cations may be carried out by reacting the cations in the solution with an alkali metal salt of a perfluoroalkyl monocarboxylic acid to convert at least a substantial amount of the cations to compounds with the acid including a compound containing the selected cation which is selectively extractable with a polar organic solvent, by adjusting the pH of the resulting aqueous solution of perfluorocarboxylic acid compounds to a value required for the selective extraction of the selected cation, by contacting the pH adjusted solution with such a polar organic solvent which is substantially immiscible with the aqueous solution, and by separating from the extracted aqueous solution residue the polar solvent phase containing the compound of the selected cation with the perfluorocarboxylic acid. With the cation separation completed, the perfluorocarboxylic acid is recovered readily for further use in successive cation separations.

The effectiveness of cation separations carried out in accordance with the invention has been demonstrated in a considerable number of separations with the perfluorocarboxylic acids listed below, together with the respective acid and anion abbreviations used hereinafter:

Perfluoroacetic acid, H(PFA) (PFA)
Perfluoropropionic acid, H(PFP) (PFP)
Perfluorobutyric acid, H(PFB) (PFB)
Perfluorooctanoic acid, H(PFO) (PFO)
Perfluorodecanoic acid, H(PFD) (PFD)

A uniform procedure was followed in range-finding experiments for properties of compounds between single cations and a perfluorocarboxylic acid. This procedure is outlined below for the case of perfluorobutyric acid.

(1) One mg.-mole of the cation under investigation was dissolved in 50 ml. water containing 10 mg.-moles of Na(PFB).

(2) The pH of the solution was adjusted to the desired point with a few drops of strong nitric acid or aqueous ammonia.

(3) The solution was shaken for one minute with 50 ml. of ethyl ether in a separatory funnel.

(4) The degree of separation was determined by semi-quantitative techniques.

Where the separation of two cations was investigated, the initial concentration of the cation which was expected to remain in the aqueous layer was made five times the concentration of the extractable cation.

EXAMPLE 1

A mixture consisting of 1 ml. 0.152 M $UO_2(NO_3)_2$, 2.5 mg. $HVO_3$, 10 ml. 1 M Na(PFB), and 38 ml. $H_2O$ was adjusted to pH 1.65 and shaken with 50 ml. of ether. The uranium passed into the ether layer and showed an extraction coefficient K of about 10 (K=amount of cation in polar organic solvent layer/amount of cation in aqueous layer); no vanadium was found in the ether layer. When penta-ether was used as the organic extractant, the K value was about 36 (this is a minimum value based on analysis of microgram quantities of uranium in the aqueous layer), and no vanadium was extracted. No salting out agent was employed.

EXAMPLE 2

Experiments conducted as described above indicated that both Be(II) and Al(III) could be extracted well with H(PFB). Although the experiments showed a variation in pH level for best results with these two ions, there was sufficient crossover between phases so that sharp separation could not be effected in a single stage extraction. However, in this instance we may take advantage of the fact that Al is strongly complexed by Versene-3, whereas, Be is only weakly complexed or not complexed at all. Versene-3 in the aqueous layer prevents the extraction of Al while permitting the Be to extract as before. In general, the known specific complex chemistry of the cations can be employed as an aid in particular separations.

EXAMPLE 3

Beryllium hydroxide contaminated with aluminum hydroxide was dissolved in nitric acid and Na(PFB) added in 10 times the molar equivalent of the beryllium nitrate present. Enough Versene-3 was added to complex the aluminum present and the solution adjusted to pH 5.0 by adding aqueous NaOH. The solution was then contacted with an equal volume of ethyl ether and the liquids commingled for one minute. The layers were allowed to separate. On analysis, it was found that the ether layer contained substantially all of the beryllium but no aluminum; the aqueous layer contained the aluminum and only a trace of beryllium.

EXAMPLE 4

Twenty ml. of a solution 0.015 M in both NaCl and CsCl was mixed with 10 ml. of a reagent solution made by dissolving 1 g. of H(PFD) in 100 ml. $H_2O$ and 10 ml. acetone. From this mixture, the Cs was substantially completely recovered as a flocculent, microcrystalline precipitate. The Na content of the solution was unaffected by the addition of the reagent solution.

EXAMPLE 5

A solution 0.015 M in both aluminum and ferric nitrates was readily freed of both metal ions by adding 20 times the molar quantity of Na(PFB), adjusting the pH to about 2.0 and contacting with an equal volume of ether for one minute. There is, however, no appreciable separation of the two metal ions in this operation. Substantially complete separation of these metal ions was obtained by addition of fluoride ion, as sodium fluoride, in a molar equivalent to the amount of Al-ion present. The Al(III) is completely complexed as the monofluoride, probably the AlF(II) ion, and was not extracted in the organic solvent layer. The extraction of Fe(III) is not affected as long as the fluoride ion content of the solution is not greater, on a molar basis, than the Al(III) ion content; if the fluoride ion is present in a greater concentration than this, the Fe(III) ion will also be complexed as a fluoride and the extent of extraction will be diminished according to the extent of such complex formation.

EXAMPLE 6

A solution 0.015 M is Fe(III) nitrate and containing 5 times this quantity of $Pb(NO_3)_2$ and 0.3 mole of Na(PFB) was adjusted to pH 2.0 and contacted with an equal volume of ether. The Fe(III) was substantially completely extracted into the ether layer, while the Pb(II) was not extracted.

Experiments conducted as described above, on a single shakeout extraction basis, gave clean-cut separations of the following cation mixtures: Ca(II)/Li; Fe(III)/Pb(II); Fe(III)/Ni(II); Al(III)/Fe(II); Fe(III)/Cu(II); and U(IV)/$UO_2$(II); last separation was determined qualitatively).

The numerous cation separations which have been made are summarized below in terms of the position of the cation in the periodic system. The pH referred to is the initial pH of the aqueous layer. Since acid is extracted into the organic solvent layer along with the cation, there is a considerable change in the acidity of the aqueous layer. The extraction coefficients, K, are approximations only, since these values are highly dependent on the precise conditions of the respective experiments. Furthermore, the work has not been sufficiently extensive so that the conditions described may necessarily be considered optimum.

*Sub-group*

IA. Li and Na were not precipitated by H(PFD); K and Rb were partially precipitated by H(PFD); Cs was precipitated quantitatively by H(PFD).

IB. Cu(II) was extracted poorly using H(PFB), K<1.0; but was extracted with H(PFO), and was also extracted in a lower pH range with H(PFP); Ag(PFB) showed poor extraction into ether (K=0.184) and benzene (K=0.018).

IIA. Be(II) was extracted at pH 2.0–5.0 using H(PFB); Mg(II) was extracted at pH 10.0 using H(PFO); Ca(II) was extracted at pH 8.5 using H(PFO).

IIB. Zn(II) was extracted at pH 6.0 with H(PFO), but was extracted poorly with H(PFB), K<1.0.

IIIA. Y(III) was extracted with H(PFB) only to extent K=1, but was extracted effectively with H(PFO).

IIIB. Al(III) was extracted at pH 2–3.4 using H(PFB), K=10, and was precipitated quantitatively at pH 5.1 in presence of Na(PFB).

IVA. Ti(IV) in aqueous solution exists only as highly complexed ions and is not extracted with H(PFB) or H(PFO).

IVB. Pb(II) was not extracted using H(PFB), but was extracted using H(PFO).

VA. V(V) did not extract down to pH 2.0 using H(PFB).

VB. BiO(I) was precipitated quantitatively with Na(PFA) from strongly acid solution (pH 1.0).

VIA. Cr(III) was extracted at pH 4.0 using H(PFB), K=4.

VIIA. Mn(II) was not extracted at any pH using H(PFB), but was extracted using H(PFO).

VIIIA. Fe(III) was extracted at pH 2.0 using H(PFB), K=200. Fe(II) and Ni(II) extracted poorly or not at all using H(PFB), but were extracted using H(PFO).

*Lanthanide series*

Nd(III) was not extracted effectively using H(PFB), but was extracted effectively using H(PFO).

*Actinide series*

$UO_2$(II) was extracted at pH 3.8 using H(PFB), K=10, and was extracted using H(PFP).

U(IV) was extracted at pH 2.0 using H(PFB), K=50, and was extracted using H(PFA).

The results from a very considerable number of experiments are the basis for the following generalizations in respect to the separation of cations from aqueous solutions:

(1) Extractability of a cation depends on the actual cationic valence of the metal in solution and is the greater the higher the valence, i. e., extractability increases in the order 1<2<3. In this connection we should point out that while bismuth may in aqueous solution have a formal valence of three, it is present in all but the most strongly acid solutions as BiO(I), the bismuthyl ion, and as such it acts as a monovalent ion insofar as extractability is concerned. Many other formally high valent cations act in a similar fashion.

(2) Although cationic valence appears to be the major influence in determining the extractability of a cation, it has been found further that the ionic radius of the cation has an important influence. In general, the smaller the cationic radius the more readily are complexes formed between the cation and the perfluorocarboxylic acids. Such complex formation appears to be essential if successful extraction is to result.

(3) The valence order of extractability given in (1) above is based largely on tests using H(PFB) as the complexing-extracting agent. It was found that the 2 valent cations were scarcely extracted at all using H(PFB) while the use of H(PFO) under the proper pH conditions resulted in essentially complete extraction of divalent cations. Even with the latter acid most monovalent cations are not extracted. Still higher molecular perfluorocarboxylic acids may well accomplish the separation of monovalent cations, as evidenced by the quantitative precipitation of cesium using H(PFD).

(4) Extraction is sensitively dependent on pH. In general, extraction is poor at pH values much less than 2, while at a high pH precipitation of insoluble metal hydroxides ensues. It was observed early in this study that the extraction appeared to proceed best at a pH just below the point at which hydroxide formation begins in the aqueous solutions. This observation extends also to such ions as Be(II) and Mg(II). It should, however, be noted that the pH values given herein for best extraction are preliminary only and may be subject to revision when a much more extensive examination of specific systems is carried out with precise control of all significant factors.

(5) Extraction is dependent on the ratio of moles of extractant reagent to moles of cation under the conditions described for experiments as conducted. Thus, Fe(III) is not extracted when the ratio to H(PFB) is 1:2 but it is essentially completely extracted at a ratio of 1:9. This observation is at least partially conditioned by the concentration of cations in solution. Thus, from a solution at pH 3.0 containing only 2 micrograms of Fe(III), no iron was extracted into the ether layer using 1 drop of 0.2 M Na(PFB); Fe(III):(PFB)=1:100. However, 1 ml. 0.2 M Na(PFB) caused the development of a perceptible yellow color in the ether layer, showing the presence of iron therein. On the other hand, it is known that an excess of H(PFB) is extracted into the ether layer along with the metallic cation and the real concentration of $(PFB)^{-1}$ ion in the aqueous layer is substantially modified by this "side reaction."

(6) Although analytical data obtained in connection with some of the metallic cations extracted by the process of this invention indicate that the extracted species is a metallic cation-perfluorocarboxylic acid complex, it is equally clear that the complex is not a strong one. Addition of fluoride ion or sulfate ion to the aqueous layer will prevent the extraction of most of the cations tested to date. While no great amount of work has been devoted to this aspect of the problem, some surprising cases of stoichiometry have been observed. Thus, within the limit of precision of the experiment, the extraction of Al(III) is absolutely prevented by the addition of fluoride ion in a 1:1 molar ratio. Iron(III) ion does not compete with Al(III) for fluoride at this level of fluoride content and under these conditions iron is extracted and aluminum left behind in the aqueous layer.

The process of the present invention may be used effectively to produce compounds of individual cations with perfluorocarboxylic acids, with the extraction step serving to make a separation from the alkali metal ions of the carboxylic acid salt used for the initial compound formation.

In certain instances, it is not necessary or desirable to use an excess of the stoichiometric equivalent of alkali metal-perfluoro-carboxylic acid salt in respect to all of the cations present in the initial aqueous solution, but rather the excess in respect to the selected cation or cations being separated. This is true particularly when such original aqueous solution contains alkali metal ions from which the selected cation or cations are to be separated.

The present invention may be so controlled as to obtain a separation of individual metallic cations from an aqueous solution containing a mixture of cations, or, where more complex systems are involved, may be controlled so that two or more metallic cations may be separated from such a mixture, with subsequent change in conditions to make further separations as may be required.

The metallic cations in aqueous solution should be associated initially with anions which will not interfere with subsequent process steps. Ordinarily, it has been found that chloride, bromide, iodide, nitrate and perchlorate ions may generally be appropriate. The fluoride and sulfate ions usually interfere, but an exception in respect to the fluoride ion has been given above.

A perfluorocarboxylic acid, or an alkali metal salt thereof, is the essential metallic cation complexing reagent of this invention. The generic term "perfluorocarboxylic acid" is specifically defined for this description and for the claims to mean highly fluorinated carboxylic acids of high stability as represented by (1) substantially true perfluoroalkyl monocarboxylic acids, as scientifically defined, (2) chlorofluorocarboxylic acids, and (3) hydrofluorocarboxylic acids; (2) and (3) are highly fluorinated carboxylic acids as produced industrially wherein it is not possible or practical to remove the last or all of the chlorine or hydrogen during fluorination. Omega-H fluorocarboxylic acids are examples of group (3).

The polar organic solvent used to selectively extract from an aqueous solution the selected metallic cation-perfluorocarboxylic acid complex is one in which said complex is readily soluble, while said solvent is substantially immiscible with the aqueous solution being extracted. Such solvents are represented by aliphatic alcohols, ethers, ketones and phosphates.

The separation proper for the selected metallic cation results when the metallic cation-perfluorocarboxylic acid complex is available in the separated polar organic solvent phase. However, a further separation is essential in order that the perfluorocarboxylic acid may be available for further use. This is accomplished by contacting this organic solvent extract phase with an aqueous solution of a reagent capable of reversing the reaction resulting in the initial formation of the compound between the selected cation and the perfluorocarboxylic acid, thereby removing said cation from the organic to an aqueous layer with the retention of the perfluorocarboxylic acid in the organic layer. There are several ways to cause this reversal depending upon the cation and/or acid of the complex; the organic solvent phase may be contacted with a solution containing a strong mineral acid, it may be contacted with water which has had the pH properly adjusted, or it may be contacted with an aqueous solution of a salt capable of reversing the reaction, as indicated above.

Furthermore, the extracted aqueous residue may also contain a minor amount of the perfluorocarboxylic acid reagent. Likewise as in the case of the treatment of the polar organic solvent phase to recover the acid, such acid may be removed by making the aqueous residue strongly acid and contacting it with fresh organic solvent which results in the reagent acid being extracted into the immiscible polar solvent. The degree of acidity required depends upon the chain length of the reagent acid in the sense that the shorter the acid chain length the more strongly acid must the aqueous solution be to obtain effective separation in this manner.

We claim:

1. A process for separating a selected metallic cation from an aqueous solution containing a mixture of metallic cations which comprises contacting the cations in said solution with an excess of the stoichiometric equivalent of an alkali metal salt of a perfluoromonocarboxylic acid to convert all of said cations to compounds with said acid including a compound containing said selected cation which is selectively extractable with a substantially water insoluble polar organic solvent selected from the group consisting of alcohols, ethers, ketones and phosphates, adjusting the pH of the resulting aqueous solution of perfluorocarboxylic acid compounds to a value required for the selective extraction of said selected cation, contacting said pH adjusted aqueous solution with said polar organic solvent which is substantially immiscible with said aqueous solution, and separating from the extracted aqueous solution residue the polar organic solvent phase containing the compound of the selected cation with said perfluorocarboxylic acid.

2. A process for separating a selected metallic cation from an aqueous solution containing a mixture of metallic cations which comprises contacting the cations in said solution with an excess of the stoichiometric equivalent of an alkali metal salt of a perfluoroalkyl monocarboxylic acid which has from 2 to 12 carbon atoms in the molecule to convert all of said cations to compounds with said acid including a compound containing said selected cation which is selectively extractable with a substantially water insoluble polar organic solvent selected from the group consisting of alcohols, ethers, ketones and phosphates, adjusting the pH of the resulting aqueous solution of perfluorocarboxylic acid compounds to a value required for the selective extraction of said selected cation, contacting said pH adjusted aqueous solution with said polar organic solvent which is substantially immiscible with said aqueous solution, and separating from the extracted aqueous solution residue the polar organic solvent phase containing the compound of the selected cation with said perfluorocarboxylic acid.

3. A process for separating a selected metallic cation from an aqueous solution containing a mixture of metallic cations which comprises contacting the cations in said solution with an excess of the stoichiometric equivalent of an alkali metal salt of a perfluoroalkyl monocarboxylic acid which has from 2 to 12 carbon atoms in the molecule to convert all of said cations to compounds with said acid including a compound containing said selected cation which is selectively extractable with a polar organic solvent, adjusting the pH of the resulting aqueous solution of perfluorocarboxylic acid compounds to a value required for the selective extraction of said selected cation, contacting said pH adjusted aqueous solution with said polar organic solvent, selected from the group consisting of aliphatic alcohols, ethers, ketones and phosphates, which is substantially immiscible with said aqueous solution, and separating from the extracted aqueous solution residue the polar organic solvent phase containing the compound of the selected cation with said perfluorocarboxylic acid.

4. A process for separating a selected metal cation from an aqueous solution containing a mixture of metal cations which comprises preparing an aqueous solution of said cations associated with an anion selected from the group consisting of chloride, bromide, iodide, nitrate and perchlorate, contacting the cations in said solution with an excess of the stoichiometric equivalent of an alkali metal salt of a perfluoromonocarboxylic acid to convert all of said cations to compounds with said acid including a compound containing said selected cation which is selectively extractable with a substantially water insoluble polar organic solvent selected from the group consisting of alcohols, ethers, ketones and phosphates, adjusting the pH of the resulting aqueous solution of perfluorocarboxylic acid compounds to a value required for the selective extraction of said selected cation, contacting said pH adjusted aqueous solution with said polar organic solvent which is substantially immiscible with said aqueous solution, and separating from the extracted aqueous solution residue the polar organic solvent phase containing the compound of the selected cation with said perfluorocarboxylic acid.

5. A process for separation of a selected metal cation from an aqueous solution containing a mixture of metal cations which comprises preparing an aqueous solution of said cations associated with an anion selected from the group consisting of chloride, bromide, iodide, nitrate and perchlorate, contacting the cations in said solution with an excess of the stoichiometric equivalent of an alkali metal salt of a perfluoroalkyl monocarboxylic acid which has from 2 to 12 carbon atoms in the molecule to convert all of said cations to compounds with said acid including a compound containing said selected cation which is selectively extractable with a substantially water insoluble polar organic solvent selected from the group consisting of alcohols, ethers, ketones and phosphates, adjusting the pH of the resulting aqueous solution of perfluorocarboxylic acid compounds to a value required for the selective extraction of said selected cation, contacting said pH adjusted aqueous solution with said polar organic solvent which is substantially immiscible with said aqueous solution, and separating from the extracted aqueous solution residue the polar organic solvent phase containing the compound of the selected cation with said perfluorocarboxylic acid.

6. A process for separating a selected metal cation from an aqueous solution containing a mixture of metal cations which comprises preparing an aqueous solution of said cations associated with an anion selected from the group consisting of chloride, bromide, iodide, nitrate and perchlorate, contacting the cations in said solution with an excess of the stoichiometric equivalent of an alkali metal salt of a perfluoroalkyl monocarboxylic acid which has from 2 to 12 carbon atoms in the molecule to convert all of said cations to compounds with said acid including a compound containing said selected cation which is selectively extractable with a polar organic solvent, adjusting the pH of the resulting aqueous solution of perfluorocarboxylic acid compounds to a value required for the selective extraction of said selected cation, contacting said pH adjusted aqueous solution with said polar organic solvent selected from the group consisting of aliphatic alcohols, ethers, ketones and phosphates, which is substantially immiscible with said aqueous solution, and separating from the extracted aqueous solution residue the polar organic solvent phase containing the compound of the selected cation with said perfluorocarboxylic acid.

7. A process for separating a selected metallic cation from an aqueous solution containing a mixture of cations which comprises contacting the cations in said solution with an amount of an alkali metal salt of a perfluoroalkyl monocarboxylic acid which has from 2 to 12 carbon atoms in the molecule for the desired extent of conversion of said cations to compounds with said acid including a compound containing said selected cation which is selectively extractable with a polar organic solvent, adjusting the pH of the resulting aqueous solution of perfluorocarboxylic acid compounds to a value required for the selective extraction of said selected cation, contacting said pH adjusted aqueous solution with said polar solvent selected from the group consisting of aliphatic alcohols, ethers, ketones and phosphates, which is substantially immiscible with said aqueous solution, separating from the extracted aqueous solution residue the polar organic solvent phase containing the selected cation compound with said perfluorocarboxylic acid, contacting said polar organic solvent phase with an aqueous solution of a reagent capable of reversing the reaction resulting in the formation of a compound between said selected cation and said perfluorocarboxylic acid thereby removing said cation from the organic layer to the aqueous layer, and separating the aqueous solution phase containing said selected cation from the organic solvent phase containing said perfluorocarboxylic acid.

8. A process for separating a selected metal cation from an aqueous solution containing a mixture of metal cations which comprises preparing an aqueous solution of said cations associated with an anion selected from the group consisting of chloride, bromide, iodide, nitrate and perchlorate, contacting the cations in said solution with an amount of an alkali metal salt of a perfluoroalkyl monocarboxylic acid which has from 2 to 12 carbon atoms in the molecule for the desired extent of conversion of said cations to compounds with said acid including a compound containing said selected cation which is selectively extractable with a polar organic solvent, adjusting the pH of the resulting aqueous solution of perfluorocarboxylic acid compounds to a value required for the selective extraction of said selected cation, contacting said pH adjusted aqueous solution with said polar solvent selected from the group consisting of aliphatic alcohols, ethers, ketones and phosphates, which is substantially immiscible with said aqueous solution, separating from the extracted aqueous solution residue the polar solvent phase containing the compound of the selected cation with said perfluorocarboxylic acid, contacting said polar solvent phase with an aqueous solution of a reagent capable of reversing the reaction resulting in the formation of a compound between said selected cation and said perfluorocarboxylic acid thereby removing said cation from the organic to the aqueous layer, and separating the aqueous phase containing said selected cation from the organic solvent phase containing said perfluorocarboxylic acid.

9. A process for separating a selected metal cation from an aqueous solution containing a mixture of metal cations which comprises treating said aqueous solution with a reagent selected from the group consisting of a perfluoromonocarboxylic acid and an alkali metal salt of a perfluoromonocarboxylic acid to produce a compound between said selected cation and said perfluorocarboxylic acid which is substantially insoluble in a substantially water immiscible polar organic solvent phase selected from the group consisting of alcohols, ethers, ketones and phosphates while the compounds formed between the other cations in said aqueous solution and said perfluorocarboxylic acid are substantially soluble in said solvent phase.

10. A process for separating a selected metallic cation from an aqueous solution containing a mixture of cations which comprises contacting at least the selected metallic cation in said solution with an excess of the stoichiometric equivalent of an alkali metal salt of a perfluoromonocarboxylic acid to convert said cation to a compound with said acid which is selectively extractable with a substantially water insoluble polar organic solvent selected from the group consisting of alcohols, ethers, ketones and phosphates, adjusting the pH of the resulting aqueous solution to a value required for the selective extraction of said cation-acid compound, contacting said pH adjusted aqueous solution with said polar organic solvent which is substantially immiscible with said aqueous solution, and separating from the extracted aqueous solution residue the polar organic solvent phase containing the compound of said cation and said perfluorocarboxylic acid.

11. A process for separating selected metallic cations from an aqueous solution containing a mixture of cations which comprises contacting at least the selected metallic cations in said solution with an excess of their stoichiometric equivalent of an alkali metal salt of a perfluoromonocarboxylic acid to convert said selected metallic cations into compounds with said acid which are selectively extractable with a substantially water insoluble polar organic solvent selected from the group consisting of alcohols, ethers, ketones and phosphates, adjusting the pH of the resulting aqueous solution to a value required for the selective extraction of said cation-acid compounds, contacting said pH adjusted aqueous solution with said polar organic solvent which is substantially immiscible with said aqueous solution, and separating from the extracted aqueous solution residue the polar organic solvent phase containing the compounds of said cations with said perfluorocarboxylic acid.

12. A process for separating a selected metallic cation from an aqueous solution containing a mixture of cations which comprises contacting at least the selected metallic cation in said solution with an excess of the stoichiometric equivalent of an alkali metal salt of a perfluoromonocarboxylic acid to convert said cation to a compound with said acid which is selectively extractable with a substantially water insoluble polar organic solvent selected from the group consisting of alcohols, ethers, ketones and phosphates, adding a second metallic-cation-complexing reagent capable of combining preferentially with at least one of the metallic cations in said aqueous solution to modify the compound complex between such cation and said perfluorocarboxylic acid, adjusting the pH of the resulting aqueous solution to a value required for the selective extraction of the selected cation-acid compound, contacting said pH adjusted aqueous solution with said polar organic solvent which is substantially immiscible with said aqueous solution, and separating from the extracted aqueous solution residue the polar organic solvent phase containing the compound of said selected cation with said perfluorocarboxylic acid.

13. A process for separating selected metallic cations from an aqueous solution containing a mixture of cations which comprises contacting at least the selected metallic cations in said solution with an excess of their stoichiometric equivalent of an alkali metal salt of a perfluoromonocarboxylic acid to convert said selected metallic cations into compounds with said acid which are selectively extractable with a substantially water insoluble polar organic solvent selected from the group consisting of alcohols, ethers, ketones and phosphates, adding a second metallic-cation-complexing reagent capable of combining preferentially with at least one of the metallic cations in said aqueous solution to modify the compound complex between such cation and said perfluorocarboxylic acid, adjusting the pH of the resulting aqueous solution to a value required for the selective extraction of the selected cations-acid compounds, contacting said pH adjusted aqueous solution with said polar organic solvent which is substantially immiscible with said aqueous solution, and separating from the extracted aqueous solution residue the polar organic solvent phase containing the compounds of the selected cations with said perfluorocarboxylic acid.

14. A process for producing a compound between a metallic cation and a perfluorocarboxylic acid which comprises contacting the metallic cation in aqueous solution with an excess of the stoichiometric equivalent of an alkali metal salt of a perfluoromonocarboxylic acid to convert said cations into a compound with said acid which is selectively extractable with a substantially water insoluble polar organic solvent selected from the group consisting of alcohols, ethers, ketones and phosphates, adjusting the pH of the resulting aqueous solution to a value required for the selective extraction of the cation-acid compound, contacting said pH adjusted aqueous solution with said polar organic solvent which is substantially immiscible with said aqueous solution, and separating from the extracted aqueous solution residue the polar organic solvent phase containing the compound of said cation with said perfluorocarboxylic acid.

References Cited in the file of this patent

UNITED STATES PATENTS

| | | |
|---|---|---|
| 2,559,619 | Berry | July 10, 1951 |
| 2,567,011 | Diesslin et al. | Sept. 4, 1951 |
| 2,662,835 | Reid | Dec. 15, 1953 |